(12) United States Patent
Tokutomi

(10) Patent No.: US 10,120,620 B2
(45) Date of Patent: Nov. 6, 2018

(54) INFORMATION MANAGEMENT SYSTEM AND METHOD FOR MANAGING INFORMATION

(71) Applicant: Seiko Epson Corporation, Tokyo (JP)

(72) Inventor: Fumio Tokutomi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/205,607

(22) Filed: Jul. 8, 2016

(65) Prior Publication Data

US 2017/0017441 A1    Jan. 19, 2017

(30) Foreign Application Priority Data

Jul. 17, 2015 (JP) ................................ 2015-142713

(51) Int. Cl.
*G06F 3/12* (2006.01)
*G06F 17/30* (2006.01)

(52) U.S. Cl.
CPC .......... *G06F 3/1205* (2013.01); *G06F 3/1257* (2013.01); *G06F 3/1273* (2013.01); *G06F 17/30017* (2013.01)

(58) Field of Classification Search
CPC ............. G06F 3/1205; G06F 17/30017; G06F 3/1293; G06F 3/1273; G06F 3/1257
USPC ....................................................... 358/1.15
See application file for complete search history.

(56) References Cited

U.S. PATENT DOCUMENTS

| | | | |
|---|---|---|---|
| 6,581,092 B1 * | 6/2003 | Motoyama | G06F 11/2294 709/206 |
| 6,850,341 B1 * | 2/2005 | Ito | H04N 1/6097 358/1.9 |
| 7,258,498 B2 * | 8/2007 | Hatta | H04N 1/00132 358/1.9 |
| 7,355,748 B2 * | 4/2008 | Arai | H04N 1/603 356/402 |
| 7,755,784 B2 * | 7/2010 | Parry | G06K 15/00 358/1.13 |
| 8,072,618 B2 * | 12/2011 | Aiso | H04N 1/00132 358/1.1 |
| 2015/0220817 A1 * | 8/2015 | Kujirai | G06K 15/021 358/1.15 |

FOREIGN PATENT DOCUMENTS

| | | |
|---|---|---|
| JP | 2000-025307 A | 1/2000 |
| JP | 2006-240227 A | 9/2006 |
| JP | 2011-158962 A | 8/2011 |

* cited by examiner

*Primary Examiner* — Neil R McLean
(74) *Attorney, Agent, or Firm* — Workman Nydegger

(57) ABSTRACT

An information management system includes a storage unit that stores media information, which is information relating to media for printing, and used in print processing using the media, a recording unit that records information relating to usage results of the media information, and an information disclosure unit that discloses, through a communication line, the media information of which the usage results satisfy a predetermined disclosure condition among the media information stored in the storage unit.

17 Claims, 7 Drawing Sheets

| ID | MEDIA INFORMATION ||||| RI ||| EI |
| --- | --- | --- | --- | --- | --- | --- | --- | --- | --- |
| | NAME OF MANUFACTURER | NAME OF MEDIA | PARAMETER 1 | PARAMETER 2 | ... | NUMBER OF USERS | NUMBER OF TIMES OF USAGE | EVALUATION | CREATOR |
| 1 | A | A001 | | | | | | | DEVICE MANUFACTURER |
| 2 | A | A002 | | | | | | | DEVICE SALES COMPANY |
| 3 | B | B001 | | | | | | | MEDIA MANUFACTURER |
| 4 | B | B002 | | | | | | | RIP SALES COMPANY |
| 5 | B | B003 | | | | 20 | 1000 | 4.2 | USER a |
| 6 | B | B003 | | | | 10 | 400 | 3.5 | USER b |
| ... | | | | | | | | | |

FIG. 6B

ID: 5 MEDIA: B003 (B)  CREATOR: USER a

| NO. | EVALUATION | COMMENT |
| --- | --- | --- |
| 1 | 4 | ○○○○○○ |
| 2 | 3 | △△△△△ |
| ... | ... | ... |

| CONFIGURATION | (1) | (2) | (3) | (4) | (5) | (6) | (7) |
|---|---|---|---|---|---|---|---|
| INFORMATION DISCLOSURE UNIT | MANAGEMENT SV | MANAGEMENT SV | MANAGEMENT SV | MANAGEMENT SV | MANAGEMENT SV | MANAGEMENT SV | PC/PR |
| INFORMATION INTEGRATION UNIT | INTERMEDIATE SV | INTERMEDIATE SV | INTERMEDIATE SV | INTERMEDIATE SV | — | — | — |
| RECORDING UNIT | | PC | PR | PR/PR | PC/PR | MANAGEMENT SV | PC/PR |
| STORAGE UNIT | | | | | | | |
| RECEPTION UNIT | PC + PR | | | | | PC/PR | |
| PRINT PROCESSING UNIT | | | | | | | |

INFORMATION MANAGEMENT SYSTEM AND METHOD FOR MANAGING INFORMATION

BACKGROUND

1. Technical Field

The present invention relates to a system and a method for managing media information which is information relating to media for printing and applied to print processing using the media.

2. Related Art

In an information processing system including a printing apparatus, there are various media as the media used for printing, for example, paper, resin sheets, cloth, and the like, and there are various types having different characteristics such as thickness and surface conditions. It is required to adjust processing conditions of print processing according to the type of media in order to perform preferable printing with respect to various media. For this purpose, information (hereinafter, referred to as "media information") which can be used to set print processing condition using some commercially available media is provided. As the media information, there are parameters relating to transportation conditions for transporting the media, parameters (color profile) for matching color, or the like.

Since new products for a printing apparatus and media are released on the market, existing media information does not effectively function with respect to all of these available combinations. To solve the problem, for example, in the technology of JP-A-2011-158962 (for example, paragraph [0046]), a database of the media information is stored in a web server to which a user can access through the Internet. Accordingly, a user can call up media information from a database and apply the information to the print process, and request for creating mew media information to an information operator, in a case where there is no proper media information.

As described above, it is possible for many users to share new media information by disclosing the created media information on the web server. However, the new media information is not supplied immediately after the request of the new media information, and the created media information may not be useful for other users. Therefore, in addition to specialized operators, if the media information is also disclosed to other users by collecting the media information created by users, engineers, or the like having a certain level of knowledge, it is expected that convenience is further enhanced. Meanwhile, other users do not have knowledge and information for determining the reliability and the usefulness of the media information that is disclosed in this way. Therefore, when the all of the created media information is disclosed, it is difficult to find proper media information; as a result, the media information that is collected is not effectively used.

SUMMARY

An advantage of some aspects of the invention is to provide a technology that allows a user to effectively use the media information that is disclosed through a communication line.

According to an aspect of the invention, there is provided an information management system including: a storage unit that stores media information, which is information relating to media for printing, and used in print processing using the media; a recording unit that records information relating to usage results of the media information; and an information disclosure unit that discloses, through a communication line, the media information of which the usage results satisfy a predetermined disclosure condition among the media information stored in the storage unit.

In addition, according to another aspect of the invention, there is provided a method for managing information, comprising: storing media information, which is information relating to media for printing, and used in print processing using the media; recording information relating to usage results of the media information; and disclosing, through a communication line, the media information of which the usage results satisfy a predetermined disclosure condition among the media information stored in the storage unit.

Here, the "print processing" may indicate processing for actually printing images with respect to media, and include processing for creating print data for performing printing with respect to the media by using media information corresponding to the media.

In the invention configured as described above, the media information stored in the storage unit can be disclosed through the communication line. However, all of the media information that is stored is not necessarily disclosed, and only useful media information having certain usage results is disclosed. By disclosing the useful media information having the usage results, it is possible to disclose the media information that can be effectively used by the user.

In the information management system according to the invention, for example, the recording unit may record the number of times of usage of the media information, and the disclosure condition may be a condition where the number of times of the usage that is recorded reaches a predetermined number. Since useful media information is frequently used, the number of times of usage of the media information may serve as an indicator of the usefulness thereof. Accordingly, by disclosing media information that is used equal to or greater than a predetermined number of times, it is possible to selectively disclose and provide truly useful media information to users.

As a more specific example of the information management system according to the invention, the information management system may further include a print processing unit that performs print processing by using the media information stored in the storage unit, in which the print processing unit and the information disclosure unit may be communicatively connected with each other through the communication line. In the configuration, the print processing unit having a function for performing the print processing can perform print processing by obtaining the disclosed media information from the information disclosure unit. In addition, by disclosing media information having high usefulness among the media information stored in the storage unit on the print processing unit side, it is also possible for other users to use media information that is frequently used by some users.

Alternately, for example, the information management system may further include a print processing unit that performs the print processing by using the media information stored in the storage unit; and an information integration unit that is communicatively connected to one or more of the print processing units, in which the information integration unit may record the usage results in the print processing unit connected to the information integration unit in the recording unit.

In the configuration, the usage results in each of the print processing units connected to the information integration unit are recorded in the information integration unit. In a case where a plurality of the print processing units are connected to the communication line, it is preferable that the disclosure of the media information is comprehensively determined based on the usage results in each of the print processing units. However, in a case of a plurality of the print processing units, it is not practical to centrally manage the usage results thereof on the information disclosure unit side. By separately installing the information disclosure unit that records the usage results in the plurality of the print processing units, a processing load of the information disclosure unit is reduced.

In the configuration, the print processing unit may have a function of creating media information and storing the created media information in the storage unit, and transmits the media information of which the usage results satisfy the disclosure condition among the created media information to the information disclosure unit, and the information disclosure unit may receive and disclose the transmitted media information. In the configuration, the media information can be independently created in each of the print processing units, and the media information having certain usage results among the created media information is provided to the information disclosure unit, and is disclosed. With this, since useful media information with respect to various media is accumulated in the information disclosure unit, it is possible for users to use the accumulated media information.

In addition, for example, the information management system according to the invention may further include a reception unit that receives evaluation information relating to evaluation of the media information which is disclosed by the information disclosure unit, in which the information disclosure unit may disclose the evaluation information. By disclosing evaluation with respect to the media information, it is possible to support the user to select media information suitable for purpose from the media information that is disclosed.

Alternately, for example, the information management system may further include a reception unit that receives evaluation information relating to the evaluation of the media information which is disclosed by the information disclosure unit, in which the information disclosure unit may vary a disclosure state of the media information according to the evaluation information. With this, it is possible to disclose the media information in a more highly convenient manner for users, for example, by supplying highly evaluated with priority media information to the user, or the like.

In this case, the evaluation information may include information relating to the usage results of the media information. Evaluation result of usage results of the media information is important information for determining the usefulness of the media information for users. By disclosing such information, it is possible to help the user in searching for the media information suitable for the purpose.

In addition, for example, the reception unit may receive the evaluation information that is transmitted through the communication line. In the configuration, by aggregating the evaluation from the user who accesses the information management system through the communication line, it is possible to provide information having more applicability.

For example, the media information according to the invention may include International Color Consortium (ICC) profile information of the media. The ICC profile information of media is essential information for ensuring color reproducibility in print products, and information required by many users in order to improve image quality in print processing using the media. The disclosure of the useful media information including such information is beneficial for many users. That is, by using the ICC profile information at the time of performing print processing, it is possible to obtain print products having preferable color reproducibility using various media.

BRIEF DESCRIPTION OF THE DRAWINGS

The invention will be described with reference to the accompanying drawings, wherein like numbers reference like elements.

FIG. 6A and FIG. 6B are diagrams illustrating an example of a media information database held in the management server.

FIG. 7 is a diagram illustrating another configuration example of the information management system according to the invention.

DESCRIPTION OF EXEMPLARY EMBODIMENTS

Figure 1:
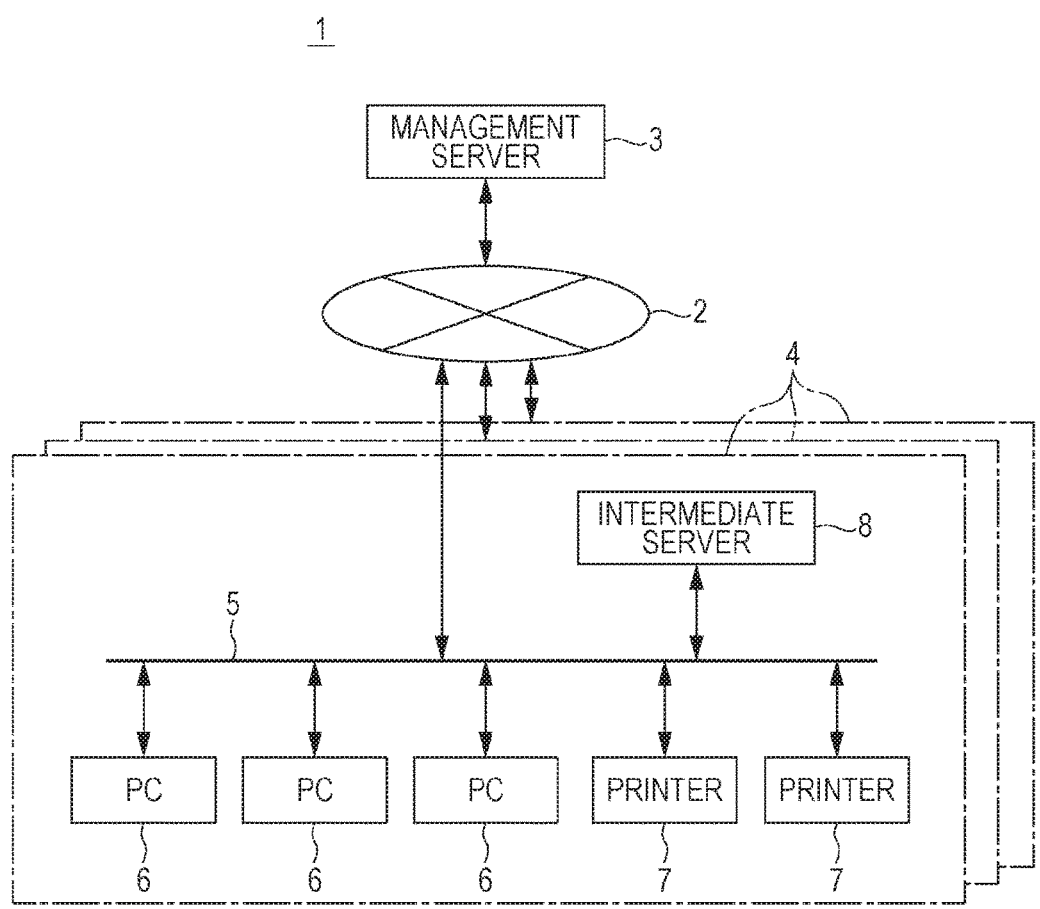
FIG. 1 is a block diagram illustrating a configuration example of an information management system capable of applying the invention.

FIG. 1 is a block diagram illustrating a configuration example of an information management system capable of applying the invention. The information management system 1 includes at least one management server 3 communicatively connected to an internet communication network 2 that is the public communication line, and at least one set of local area networks (hereinafter, referred to as "LAN") 4.

One of the LANs 4 is a network in which information terminal devices such as personal computers (hereinafter, referred to as "PC") 6, and printers 7 are connected to at least one LAN line 5 that is connected to the internet communication network 2 through a router not illustrated. In an example of FIG. 1, a plurality of the PCs 6 and a plurality of the printers 7 are connected to each of the LANs 4. However, these numbers are arbitrary, and both the PCs 6 and the printers 7 are not essential. In addition, each of the LANs 4 may include a terminal device other than the PC and the printer. Furthermore, an intermediate server 8 is connected to the LAN line 5. However, as described below, a configuration in which the intermediate server is not configured can be implemented.

One management server 3 and a plurality of sets of the LANs 4 are included in the example of the system of FIG. 1. However, a plurality of the management servers may be included therein. A set of the LANs may be implemented. In a case where the information management system 1 includes the plurality of the LANs 4, a configuration within each of the LANs 4 may be different. In addition, connection between the components described above can be implemented in a wired or wireless manner as long as it is possible to communicate with each other.

Figure 2:
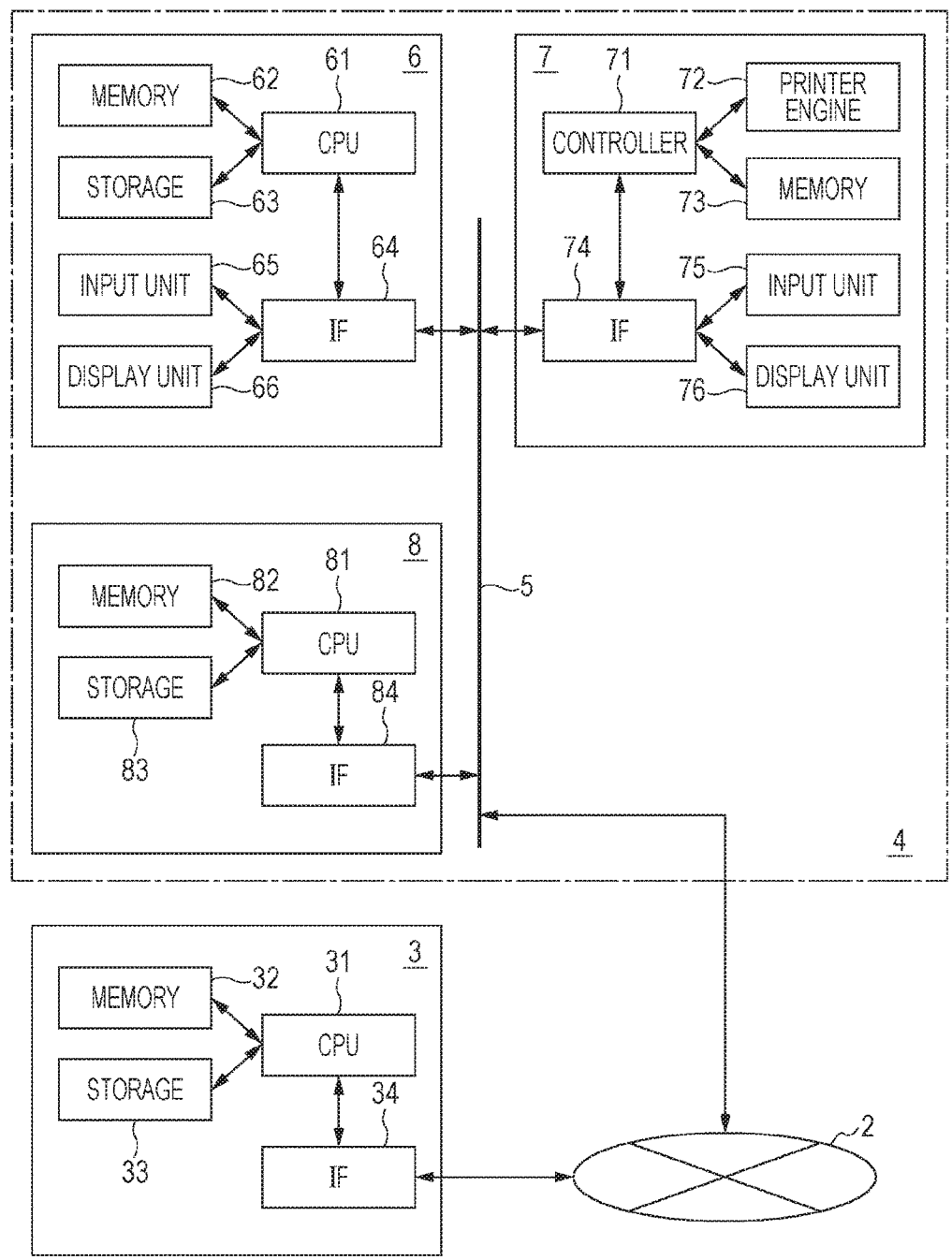
FIG. 2 is a diagram illustrating a detailed configuration of each component of the information management system.

FIG. 2 is a diagram illustrating a detailed configuration of each component of the information management system. FIG. 2 typically illustrates only one among configuration components provided as plural components in the system.

The PC 6 installed within the LAN 4 has the same configuration as a configuration of general personal computers. That is, the PC 6 includes a central processing unit (CPU) 61 that controls each unit of the PC and performs operational processing thereof, a memory 62 that temporarily stores operational data, a storage 63 that stores control programs and various data to be executed by the CPU 61, an interface (IF) 64 that performs communication with the outside, an input unit 65 that receives operation inputs from a user, a display unit 66 that performs various types of notification to the user, and the like, and these units are electrically connected to each other so as to exchange data with each other.

The printer 7 also has the same configuration as a general configuration of network printers. That is, the printer 7 includes a controller 71 that controls each unit of the printer and performs data processing of the printer, a printer engine 72 that performs a printing operation on media (printing medium), a memory 73 that temporarily stores image data, an interface (IF) 74 that performs communication with the outside, an input unit 75 that receives operation inputs from the user, a display unit 76 that performs various types of notification to the user, and the like, and these units are electrically connected to each other so as to exchange data with each other.

The printer 7 may include the same storage unit as the PC 6 in order to be able to receive a large amount of image data. In addition, by assuming that the user interface is realized on the PC 6, at least one of the input unit 75 and the display unit 76 may be simplified or omitted. In addition, the printer 7 may be included in the system as a so-called network printer, connected to the PC 6 without going through the LAN line 5, and included in the information management system 1 as a so-called local printer.

The intermediate server 8 has a function of a host server that manages the LAN 4 configured by various terminal devices connected with each other through the LAN line 5. The configuration may be similar to the general PC. However, a server-only device in which an input unit and a display unit responsible for the user interface are simplified or omitted may be implemented. Specifically, the intermediate server 8 includes a CPU 81, a memory 82, a storage 83, an interface (IF) 84, and the like.

A configuration of the management server 3 is also the same as the intermediate server 8, and includes a CPU 31, a memory 32, a storage 33, an interface (IF) 34, and the like. As described below, in the information management system 1, an advantage of the management server 3 is to hold data accumulated therein in a deliverable state through the internet communication network 2. A configuration specified to a function as such a data server may also be implemented.

Figure 3:
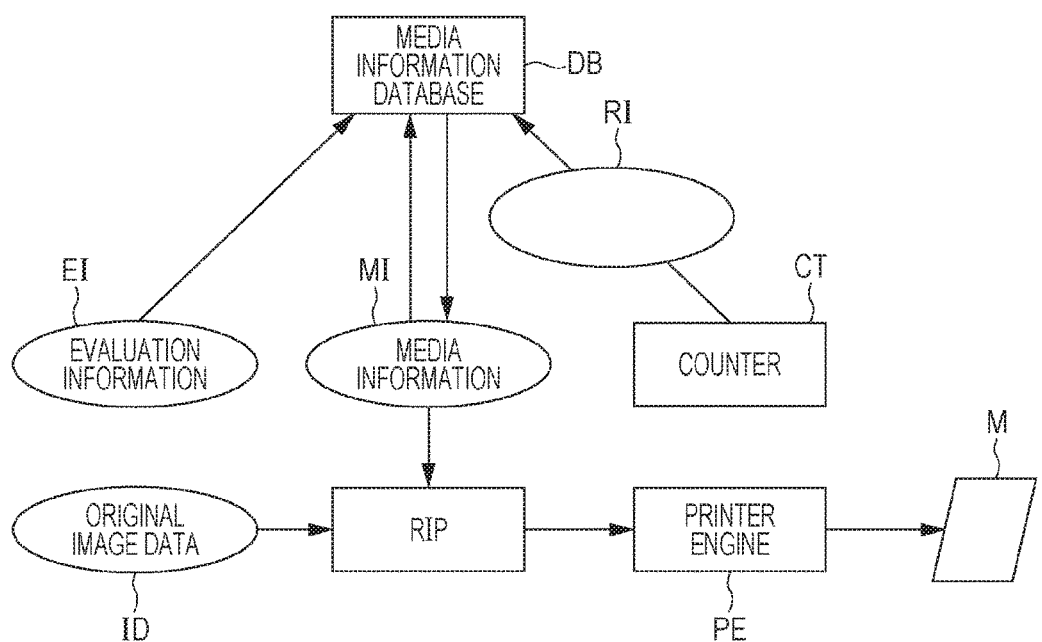
FIG. 3 is a diagram illustrating a concept of information management in the information management system.

FIG. 3 is a diagram illustrating a concept of information management in the information management system. A component surrounded by a rectangle in FIG. 3 represents a configuration physically realized by using a hardware resource and/or a software resource existing in the information management system 1 described above. In addition, a component surrounded by an ellipse in FIG. 3 represents data processed in the system.

An advantage of the information management system 1 is to effectively share media information MI, between users using the system, applied at the time of performing the print processing using media M, in relation to physical properties of the media (printing medium) M supplied for printing. The media information MI is introduced to secure desired print quality by optimizing the print processing in accordance with the physical properties of the media M, and includes various information such as mechanical parameter information relating to the transportability of the media M, color profile information relating to the coloring properties of the media M, information relating to print mode settings of the printer 7 suitable for the media M, and the like.

As the color profile information, it is possible to preferably use information that is practically standardized, for example, as an International Color Consortium (ICC) profile.

The media information MI is prepared for each type of the media M, and information from a supply source or the like with respect to some media products is disclosed. However, there may be a lot of products in which the media information is not disclosed, and there may be a case where information disclosed according to a combination with a printer or the like is not optimal. Therefore, it is necessary to modify existing media information or create new media information.

The creation of the media information is difficult for general users because expertise and specialized equipment (for example, colorimeter) are required. Therefore, it is beneficial that the media information created by those who have creation technology is disclosed through a communication line, and the disclosed result can be shared by a lot of users. Meanwhile, confusion is generated by the flow of the variety of the media information, for example, by disclosing media information of insufficient verification and many types of the media information with respect to the same media, or the like, and then as a result, concern that information sharing does not effectively function, is also generated.

The information management system 1 of the embodiment can effectively share media information by selectively disclosing only the media information with high usefulness among the media information created in various places, in view of the above problems.

As illustrated in a lower portion of FIG. 3, in the flow of general print processing, for example, the original image data ID created on the PC 6 is converted into print data by a raster image processor (RIP), and images corresponding to the original image data ID are printed on the media M by applying the print data to a print engine PE. When the print data is created by the RIP, the print data to which the physical properties of the media M are applied is created by performing data processing including the media information. With this, print quality is optimized.

At this time, it is possible to use the media information MI by calling up the media information MI, which was created in the past, registered in a media information database DB, and it is also possible to use the media information MI that is newly created according to the purpose. If the media information MI that is newly created is useful, the media information MI is additionally registered in the media information database DB.

When certain media information MI is used in the print processing, the number of times of the usage is counted by a counter CT. The number of times of the usage of the media information MI which is counted is recorded, as usage results information RI, in the media information database DB, if necessary. In addition, a user can edit evaluation information EI relating to reliability and usefulness of the used media information. The evaluation information EI is also recorded in the media information database DB, if necessary.

As described above, by performing the print processing according to which the user repeatedly uses the information management system 1, information of the media information database DB may be updated at any time such that the media information database DB is enhanced. Hereinafter, specific processing content of the information management system 1 for realizing such a concept will be described.

In the information management system 1, among configuration components illustrated in FIG. 3, the media information database DB is disposed on the management server 3 in order to be able to widely share information with users who can be connected to the internet communication network 2. In addition, a function of a printer engine PE is under the control of the printer engine 72 that is provided in each of the printers 7. In addition, a function as the RIP is controlled by each of the PCs 6, and a function as the counter CT is controlled by the intermediate server 8. However, as described below, these operations of the function sharing are not limited thereto.

"The print processing using the media information MI" referred to in this specification indicates processing until which the printing of images is actually performed on the media M, is performed by the RIP, and includes data processing for creating print data including the media information MI. That is, it is possible to consider that "only the media information MI is used" with respect to the processing without printing on the media M by staying the processing in data processing including the media information MI.

Figure 4:
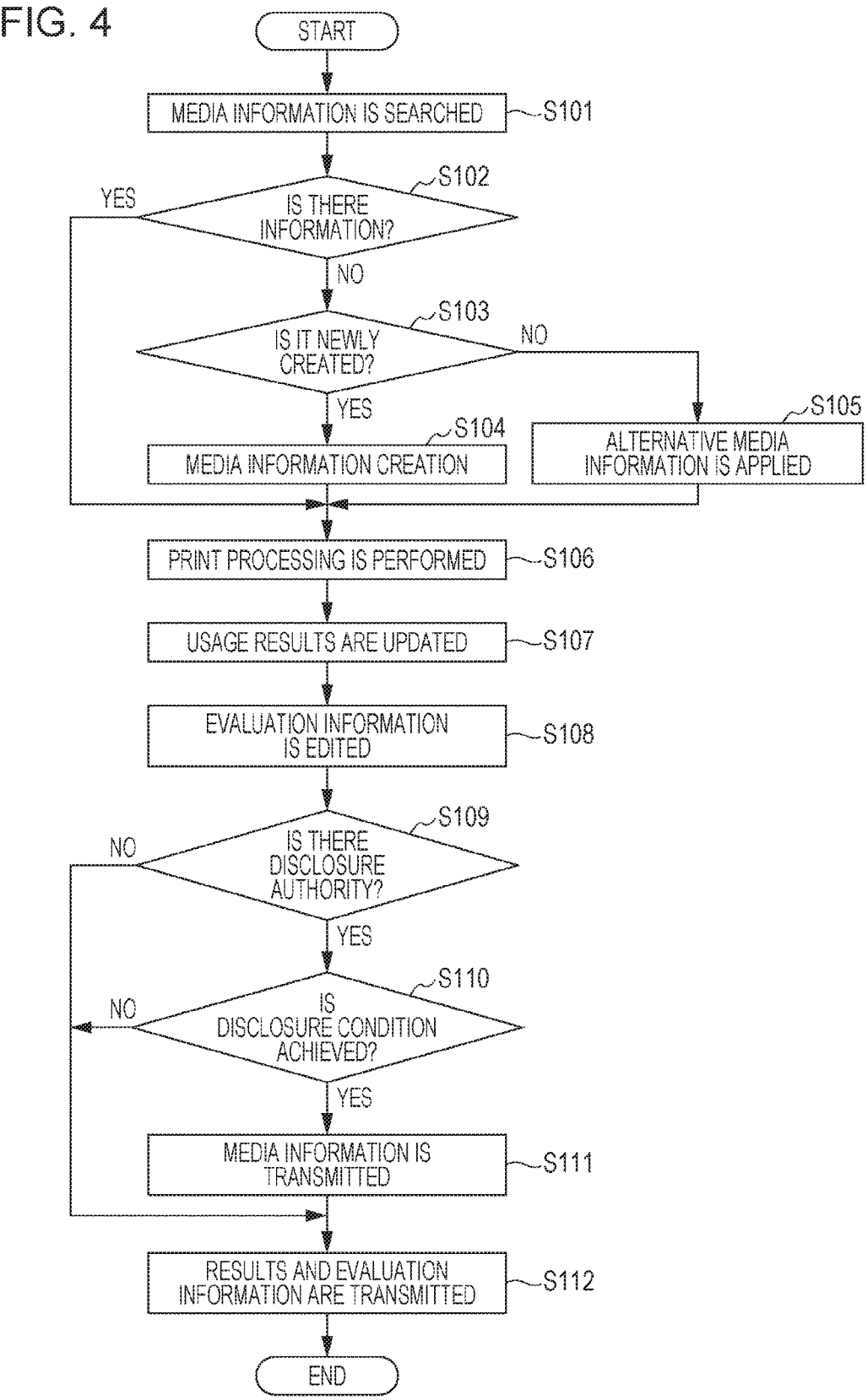
FIG. 4 is a flow chart illustrating a flow of print processing using the information management system.

FIG. 4 is a flow chart illustrating a flow of the print processing using the information management system. When execution of the print processing is instructed by a user with respect to one PC 6 on the system 1, the media information MI corresponding to the media M that is used is searched for on the system (step S101). The media information MI is searched for from the media information database DB on the management server 3. When the media information stored in the storage 63 on a PC 6 and the intermediate server 8 on the LAN 4, the existing media information also becomes a search target.

When the media information MI consistent with the used media M is searched for (YES in step S102), the print processing using the media information MI is performed (step S106). As described above, the print processing may be one of the RIP processing for creating the print data based on the original image data ID and the media information MI, and processing including until one printer 7 included in the same LAN 4 as that of the PC 6 prints images on the media M, based on the created print data.

When the media information MI consistent with the used media M is not searched for (NO in step S102), whether or not creation of the new media information is performed is queried to the user (step S103). The query is performed by displaying appropriate messages in the display unit 66 of the PC 6. When the user selects the new creation (YES in step S103), it is possible for users to create the media information on the PC 6 (step S104). The media information may be created by correcting existing information or may newly create all of the media information. When the creation of the media information is completed, the print processing is performed by applying the media information (step S106).

Meanwhile, in a case where the user does not want the new creation (NO in step S103), one of the media information MI on the system 1 is applied as alternative media information (step S105), and the print processing is performed (step S106). For example, by previously preparing standard media information for each type of typical media such as plain paper, glossy paper, resin film, or the like, it is possible to select alternate media information among the typical media according to the type of the used media M.

When the execution of the print processing is completed, information (usage results information RI) relating to usage results of the used media information MI is updated (step S107). In this example, when a function of the counter CT on the intermediate server 8 is provided and one of the media information MI is used, the number of times of accumulated usage of the media information MI, which is stored in a storage 83 of the intermediate server 8, is updated. In a case where the media information is newly created on the PC 6, the media information is also stored in the storage 83 of the intermediate server 8. With this, it is also possible for other PCs 6 and printers 7 on the same LAN 4 to use the media information.

Next, the evaluation information is edited by the user (step S107). However, the editing is not necessarily demanded for every performance of the print processing, and may be performed, for example, only when the user wants the editing and the media information is newly created, if necessary. The user can input a result of the performed print processing, for example, an evaluation with respect to image quality and a required time in print products to at least one of the input unit 65 of the PC 6 and the input unit 75 of the printer 7. The degree of satisfaction for the result may be represented by using numeric values. The evaluation information EI that is input is stored in the intermediate server 8.

The usage results information RI and the evaluation information EI of the media information used on the PC 6 disposed within the same LAN 4 are integrated and stored on the intermediate server 8. As described above, the usage results information RI and the evaluation information EI accumulated on the intermediate server 8 are obtained as material for determining reliability and usefulness of the media information MI. That is, the media information MI having high usefulness is used many times or obtains high evaluation. Meanwhile, in a case of the media information having low usefulness, the frequency of usage and the evaluation thereof become lower.

The media information, to which a certain level or more evaluation for the usefulness among the new media information newly created is obtained, is newly registered to the media information database DB disclosed on the management server 3. That is, the intermediate server 8 to which authority is given from the management entity of the management server 3, among the intermediate servers 8 connected to the internet communication network 2, is allowed to additionally register the new media information having a certain amount of the results on the intermediate server 8, in the media information database DB.

Specifically, in the intermediate server 8 to which the authority of disclosure is given from the management entity of the management server 3 (YES in step S109), whether or not the media information MI achieves a predetermined disclosure condition is determined based on the usage results information RI and the evaluation information EI (step S110). As the disclosure condition, for example, it is possible to reach the number of times of usage of the media information MI within the LAN 4 a predetermined number of times. In this case, it is possible to use one of determination based on the number of times of the accumulated usage from the start of the usage, and determination based on the number of times of the usage within a given period.

In addition to the number of times of the usage indicated by the usage results information RI, the evaluation of a user indicated by the evaluation information EI may be reflected. In a case where evaluation for each of the media information MI is represented by numeric values, it is possible to satisfy the disclosure condition for the media information MI to which a numeric value equal to or greater than a predetermined value is given. In a case where plural evaluation values are applied to one media information MI, it is possible to use the average value of the values as determination material.

If there is the media information MI which satisfies the disclosure condition (YES in step S110), the media information MI is transmitted to the management server 3 through the internet communication network 2 (step S111). At this time, the usage results information RI and the evaluation information corresponding to the media information MI are also transmitted together (step S112). In a case where the authority of disclosure is not given to the intermediate server 8 (NO in step S109), and in a case where the media information MI does not reach the disclosure condition (NO in step S110), the media information is not transmitted. However, in a case where the usage results information RI or the evaluation information EI is updated with respect to the media information previously disclosed in the media information database DB, these pieces of information may be transmitted to the management server 3 (step S112).

Figure 5:
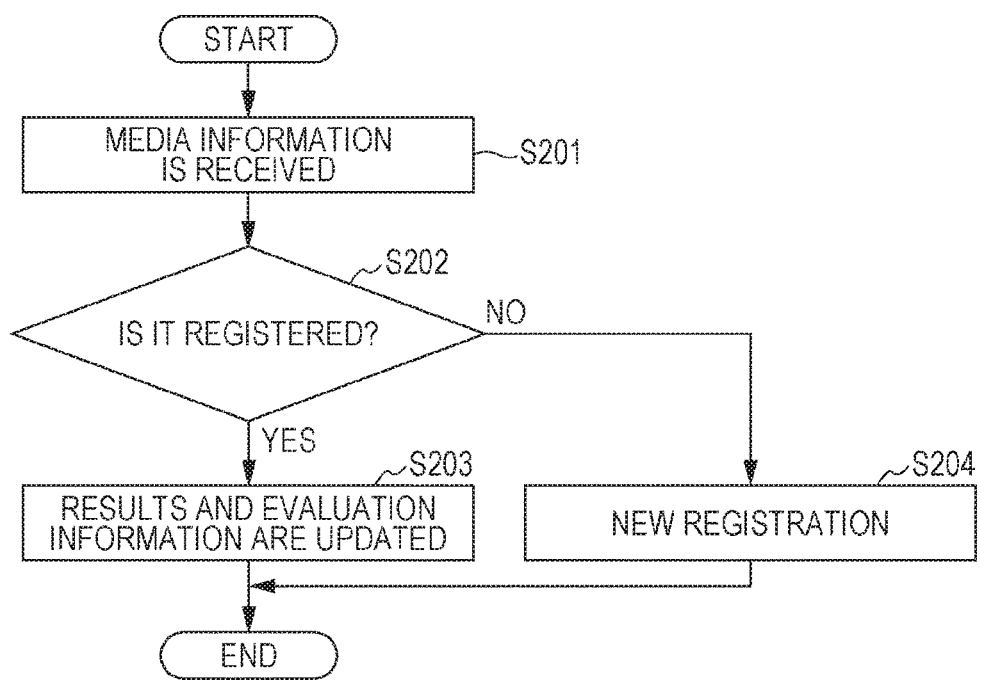
FIG. 5 is a flow chart illustrating an operation of a management server.

FIG. 5 is a flow chart illustrating an operation of the management server. The management server 3 is connected to the internet communication network 2 in many cases, and holds the media information database DB in order to be able to disclose the media information database DB on the Internet. That is, the user to whom access rights for the media information database DB is given, can access the media information database DB through the internet communication network 2, and download and use the media information MI that is registered.

In addition, in the management server 3, when information relating to the media information from the intermediate server 8 is received (step S201), if the information relates to the usage results and the evaluation information of the registered media information (YES in step S202), the usage results information RI and the evaluation information EI of the media information recorded in the media information database DB are updated as new information. Meanwhile, in a case where the media information that is newly created is received (NO in step S202), the media information MI is newly registered in the media information database DB along with the usage results information RI and the evaluation information EI (step S204). Then, the media information MI that is newly registered as described above can also be made available to other users.

FIG. 6A and FIG. 6B are diagrams illustrating an example of the media information database held in the management server. More specifically, FIG. 6A is an example of a list screen of the media information MI displayed when the user accesses the media information database DB, and FIG. 6B is an example of a detailed screen of the evaluation information EI. As illustrated in FIG. 6A, when the user accesses the media information database DB through the PC 6, a list of the registered media information MI is displayed on the display unit 66 of the PC 6. An ID for recognizing information is attached in each of the media information. However, an appropriate name may also be attached thereto.

The media information MI includes the name of manufacturer for manufacturing the media M, the name of media for specifying the type of the media M, and parameter 1, parameter 2, and the like that are various parameters relating to the physical properties of the media M. The media information MI also includes parameters relating to the ICC profile, mechanical parameters, and the like.

In addition, the media information MI is updated by transmission information from the intermediate server 8, and includes the usage results information RI such as the number of users and the number of times of the usage of the media information MI, the evaluation information EI, and information relating to the authors. For the evaluation information EI, only an average of evaluation values is displayed on the list screen.

It is considered that the media information created and disclosed on a supplier side for supplying material such as the manufacturer of devices and media among the media information MI, has certain reliability and usefulness. Accordingly, it is not necessary to display the usage results information RI and the evaluation information EI with respect to the media information, in many cases. In addition, it is possible to promote the usage of the users by displaying the media information at the upper portion of the list, in many cases.

Meanwhile, there are various levels of the reliability and the usefulness of the media information MI created and disclosed by the users. It is estimated that the media information having a large number of users and the number of times of the usage, and high evaluation has certain reliability and usefulness. As described above, by preferentially displaying the media information MI having the high evaluation at the upper portion of the list, other users can also easily find the media information MI having the usefulness. Accordingly, by frequently adding the usage results information RI and the evaluation information EI from users by using this method, selection between the media information having the high usefulness and the media information not having the high usefulness among the media information MI, proceeds. As a result, the convenience of the media information database DB for users increases.

As illustrated in FIG. 6B, it is possible to display details of the evaluation information EI that is given to each of the media information MI, as determination material at the time of selecting the media information MI. Content of the evaluation information EI given from the user with respect to each of the media information MI is displayed as a list. It is possible for the evaluation information EI to include evaluation by numeric values, comments for a use result, or the like. Evaluation may be performed on each of items by previously preparing a plurality of evaluation items. It is possible for users to use the evaluation information EI as material determining whether or not corresponding media information MI is suitable for the needs of the user.

As described above, in the information management system 1 of the embodiment, the media information MI created by the user is managed in the following manner, in order to increase the effectiveness of the media information shared through the internet communication network 2.

First, the media information MI created by the user is not immediately disclosed, and only the media information MI having certain usage results within a local group configured by the user or users included in the same LAN as that of the user is registered and disclosed in the media information database DB on the management server 3. Accordingly the media information having low usefulness with respect to other users, for example, media information that is experimentally created, media information that is created for special applications, or the like, is not disclosed. With this, confusion and inconvenience caused by disclosing a lot of media information having the low usefulness are avoided in advance. In addition, consuming of storage resources of the management server 3 by the media information that is not useful is also avoided.

Second, by disclosing that the evaluation is widely received and accumulated later from the users with respect to the media information MI that is disclosed in this manner, improved convenience of the user using new media information MI is achieved. In addition, by frequently changing an order of the media information MI displayed according to an evaluation result from the users, it is possible to easily use the media information MI having the high usefulness. As a result, the selection of the media information MI proceeds, and the convenience of the media information database DB for users is further improved.

Third, the usage results information RI and the evaluation information EI relating to the media information MI used within one of the LANs 4 are centrally processed by the intermediate server 8 installed within the LAN 4. With this, it is possible to further increase the reliability of the disclosed media information MI in order to reflect whether or not the usage results and the evaluation of plural users are disclosed. In addition, the increment of a load in the management server 3 generated by focusing information transmitted from each of the users to the management server 3 is also alleviated by installing the intermediate server 8.

As an advantage obtained by installing the intermediate server 8, there is a point in that a disclosure range of new media information created by the user can be limited. That is, in the case of a user newly creating the media information, the created media information is shared between specific users. Meanwhile, there may be a request to hide the media information from a third party. For the request, it is possible to perform disclosure in a stepwise manner so as to share information only within the local group before disclosing information, for example, to the third party by installing the intermediate server 8 and centrally managing the media information. In addition, the media information may be managed by applying information relating to whether or not the media information is disclosed to the created media information, in order to limit a disclosure time.

As described above, in the information management system 1 of the embodiment, the PC 6 and the printer 7 that are communicatively connected to the PC 6 integrally constitute a "print processing unit" of the invention, and the management server 3 functions as an "information disclosure unit" of the invention. In addition, the intermediate server 8 functions as an "information integration unit", and, particularly, the storage 83 functions as a "storage unit" and a "recording unit" of the invention. In addition, the input unit 65 of the PC 6 or the input unit 75 of the printer 7 functions as a "reception unit" of the invention. In addition, the internet communication network 2 corresponds to a "communication line" of the invention.

The invention is not limited to the embodiment. It is possible to implement various modifications with respect to the embodiment described above without departing from the gist thereof. For example, some benefits may be applied to a creator, when new media information is disclosed, in order to positively disclose the created media information by the creator. Even in a case where the disclosed media information obtains evaluation equal to or greater than a predetermined amount, the same can also be applied.

In addition, for example, the intermediate server 8 is installed for every local group connected to the LAN 4 in the embodiment. However, the installation unit of the intermediate server is not limited thereto. For example, the intermediate server may be installed on a different unit basis for every country, region, or the like with respect to the management server to be disclosed to the entire world. According to the configuration, it is possible to vary a disclosure state of the media information for each installation unit of the intermediate server. Similarly, a configuration for managing the media information, for example, for every nation and region by installing a plurality of the management servers may be implemented.

In addition, the embodiment is the information management system for managing the media information MI disclosed and shared through the internet communication network 2. However, for example, the invention can also be applied to manage the media information shared only within the local group connected with another communication line such as an internet line, or the like.

In addition, the information management system 1 described above includes, as components, the PC 6 and the printer 7 as the "print processing unit", the intermediate server 8 as the "information integration unit", and the management server 3 as the "information disclosure unit". However, as described below, it is also possible to configure the "information management system" of the invention without installing a part of these components. Even in these cases, a structure of each component may also be the same as the configuration illustrated in FIG. 2.

FIG. 7 is a diagram illustrating another configuration example of the information management system according to the invention. This diagram illustrates components for processing each requirement of the invention. In this diagram, "server" and "printer" are referred to as "SV" and "PR", respectively.

Among these, a configuration example (1) is a system configuration example including the management server 3 as the "information disclosure unit", the intermediate server 8 as the "information integration unit", the "recording unit", and the "storage unit", and the PC 6 and the printer 7 as the "reception unit" and the "print processing unit", and corresponds to the information management system 1 of the embodiment described above.

In addition, a configuration example (2) corresponds to a configuration in which a printer is omitted from the configuration example (1). As described above, the "print processing" of the invention is not limited to processing involving printing on media. It is possible to include processing, which is pre-processing of printing, until data processing (RIP processing) for creating the print data by using the media information. For managing the media information, it is not essential that the printer for performing printing based on the print data is included in the system. In this sense, it is also possible to adopt a configuration in which the printer is omitted. In this case, the PC 6 for performing the RIP processing corresponds to the "print processing unit".

Meanwhile, a configuration example (3) corresponds to a configuration in which a PC is omitted from the configuration example (1). If the printer 7 has a high degree of an operational function and a user interface function, it is possible for users to perform processing such as inputting of a print instruction and RIP processing, and the creation of the media information by directly operating the printer without using the PC. Accordingly, the PC can be omitted, and in this case, the input unit 75 of the printer 7 functions as the "reception unit", and the controller 71 and the printer engine 72 function as the "print processing unit".

As is apparent from configuration examples (1) to (3), the "reception unit" and the "print processing unit" can similarly be implemented by the PC 6 single body, the printer 7 single body, and a combination of the PC 6 and the printer 7. Therefore, hereinafter, without distinguishing these differences, the units are referred to as "PC or the like" and represented as "PC/PR" in the drawing.

In a configuration example (4), a function as the "storage unit" for storing the media information MI that is newly created or read from the media information database DB is transferred to the PC or the like, for example, the storage 63, and the intermediate server 8, as the "recording unit", have a function for collecting only the usage results information RI and the evaluation information EI. A case where there is no need to share the created media information MI within the local group is a preferable configuration example, and the intermediate server 8 has the effect of reducing the load of the management server 3.

In addition, in a configuration example (5), the intermediate server is omitted from the configuration example (4), and a function as the "recording unit" is transferred to the PC or the like such as the storage 63. By omitting the intermediate server functioning as the "information integration unit", information exchange is directly performed between each of the PC or the like and the management server 3. Although the load of the management server 3 increases, a configuration thereof is not different from the above-described configuration example in view of the management of the media information.

In a configuration example (6), a function as the "recording unit" and the "storage unit" is transferred from the configuration example (5), for example, to the storage 33 of the management server 3. In the configuration, all of information relating to the media information MI used or created on the user side is aggregated to the management server 3. Therefore, the load of the management server 3 further increases. However, if only media information that satisfies the disclosure condition among the media information MI collected by the management server 3 is disclosed, it is possible to realize the same processing described above.

Furthermore, in a configuration example (7), the all of functions is performed by the PC or the like. When the PC or the like is allowed to share internal data through the communication line, it is possible for the PC to function as the "information disclosure unit" for disclosing the media information MI. In a case of information management in a small local group, even in such configuration, it is possible to perform the management of appropriate media information without the addition of new equipment.

This application claims priority under 35 U.S.C. § 119 to Japanese Patent Application No. 2015-142713, filed Jul. 17, 2015. The entire disclosure of Japanese Patent Application No. 2015-142713 is hereby incorporated herein by reference.

What is claimed is:

1. An information management system comprising:
a processor; and
a storage unit that stores programs to be control programs and data to be executed by the processor, wherein the storage unit stores media information, wherein the media information is information relating to at least physical characteristics of the media for printing and is used in print processing to create print data from image data;
wherein the control programs and data to be executed include:
a recording unit that records an evaluation result by one or more evaluators relating to the media information for creating the print data; and
an information disclosure unit that discloses the media information to users, other than the one or more evaluators, when a value of the evaluation result is over a predetermined value,
wherein the information disclosure unit discloses, through a communication line, the media information when the evaluation result satisfies a predetermined disclosure condition among the media information.

2. The information management system according to claim 1, wherein the recording unit records the number of times of usage of the media information, and
wherein the information disclosure unit discloses, through the communication line, the media information when the usage of the media information satisfies a predetermined disclosure condition, and
wherein the disclosure condition is satisfied when the number of times of the usage reaches a predetermined number.

3. The information management system according to claim 2, further comprising:
a print processing unit that performs the print processing by using the media information stored in the storage unit,
wherein the print processing unit and the information disclosure unit are communicatively connected with each other through the communication line.

4. The information management system according to claim 3,
wherein the information disclosure unit discloses, through the communication line, the media information when the media information satisfies a predetermined disclosure condition among the media information stored in the storage unit,
wherein the print processing unit has a function of creating media information and storing the created media information in the storage unit, and transmits the media information of which the usage results satisfy the disclosure condition among the created media information to the information disclosure unit, and
wherein the information disclosure unit receives and discloses the transmitted media information.

5. The information management system according to claim 2, further comprising:
a print processing unit that performs the print processing by using the media information stored in the storage unit; and
an information integration unit that is communicatively connected to one or more of the print processing units,
wherein the information integration unit records, in the recording unit, the usage results in the print processing unit connected to the information integration unit.

6. The information management system according to claim 2, further comprising:
a reception unit that receives evaluation information relating to evaluation of the media information of a created print data which is disclosed by the information disclosure unit,
wherein the information disclosure unit discloses the evaluation information.

7. The information management system according to claim 6,
wherein the evaluation information includes information relating to the usage results of the media information.

8. The information management system according to claim 6,
wherein the reception unit receives the evaluation information that is transmitted through the communication line.

9. The information management system according to claim 1, further comprising:
a reception unit that receives evaluation information relating to evaluation of the media information which is disclosed by the information disclosure unit,
wherein the information disclosure unit varies a disclosure state of the media information according to the evaluation information.

10. The information management system according to claim 1,
wherein the media information includes International Color Consortium (ICC) profile information of the media.

11. The information management system according to claim 1, further comprising:
an intermediate server on a local area network, the intermediate server having:
a counter that records information relating to the evaluation result by evaluator; and
wherein the intermediate server transmits to the management server, through the communication line, the media information when the evaluation result satisfies a predetermined disclosure condition among the media information stored in the storage unit.

12. The information management system according to claim 11 further comprising:
wherein the management server, in communication with a plurality of other intermediate servers, discloses the media information when the evaluation results satisfy the predetermined disclosure condition.

13. The information management system according to claim 1
wherein the information disclosure unit discloses the media information on a display of the users other than the evaluator.

14. The information management system according to claim 1, wherein the disclosure unit increases a number of the users to whom the media information is disclosed when the value of the evaluation result is increased.

15. A method for managing information at a management server in communication over a communication network with a networked computer system that includes a computer and a printer, the method comprising:
maintaining media information in a deliverable state at the management server that includes a storage unit by:
receiving the media information from users;
storing the media information in the storage unit, wherein the media information is information relating to at least physical characteristics of the media for printing and is used in print processing to create print data for a printer from image data;
recording an evaluation result by one or more evaluators relating to the media information for creating the print data;
disclosing the media information to users, other than one or more evaluators, when the value of the evaluation result is over a predetermined value, and
disclosing, through a communication line, the media information when the evaluation result satisfies a predetermined disclosure condition among the media information.

16. The information management system according to claim 15, wherein the disclosing, through the communication line included in the communication network, the media information when the media information satisfies the predetermined disclosure condition.

17. The information management system according to claim 15, wherein the disclosure unit changes a number of the users to whom the media information is disclosed when the value of the evaluation result is increased.

* * * * *